United States Patent [19]

Meagher

[11] Patent Number: 5,054,020
[45] Date of Patent: Oct. 1, 1991

[54] APPARATUS FOR HIGH SPEED DATA COMMUNICATION WITH ASYNCHRONOUS/SYNCHRONOUS AND SYNCHRONOUS/ASYNCHRONOUS DATA CONVERSION

[75] Inventor: John L. Meagher, Fairfax, Va.

[73] Assignee: Digital Access Corporation, Reston, Va.

[21] Appl. No.: 507,537

[22] Filed: Apr. 11, 1990

[51] Int. Cl.[5] .................... H04L 25/38; H04L 5/24
[52] U.S. Cl. .................................. 370/48; 370/99; 370/100.100; 375/117
[58] Field of Search ............ 370/48, 49, 94.1, 94.2, 370/100.1, 9, 84, 49, 102; 375/117, 114

[56] References Cited

U.S. PATENT DOCUMENTS

| | | | |
|---|---|---|---|
| 0,000,482 | 1/1886 | Dellande | 370/48 |
| 3,962,635 | 6/1976 | Rosa | 375/4 |
| 4,034,294 | 7/1977 | Dalley | 375/5 |
| 4,048,440 | 9/1977 | Peck et al. | 370/48 |
| 4,079,240 | 3/1978 | Rynkowski | 370/55 |
| 4,087,681 | 5/1978 | Spencer et al. | 329/312 |
| 4,263,673 | 4/1981 | Bingham et al. | 375/117 |
| 4,271,507 | 6/1981 | Gable | 370/94.100 |
| 4,346,452 | 8/1982 | Groves | 364/900 |
| 4,358,825 | 11/1982 | Kyu | 364/200 |
| 4,417,213 | 11/1983 | Ito | 328/164 |
| 4,425,664 | 1/1984 | Sherman | 375/8 |
| 4,443,850 | 4/1984 | Harris | 364/200 |
| 4,455,663 | 8/1984 | Ragsdale | 375/98 |
| 4,512,026 | 4/1985 | Meiden | 370/48 |
| 4,513,373 | 4/2985 | Sheets | 364/200 |
| 4,569,062 | 2/1986 | Dellande et al. | 370/48 |
| 4,586,189 | 4/1986 | Tyrrell | 370/48 |
| 4,597,073 | 6/1986 | Staples | 370/24 |
| 4,597,074 | 6/1986 | Demichelis | 370/58.200 |
| 4,598,396 | 8/1986 | Upp | 370/27 |
| 4,601,035 | 7/1986 | Marzec | 371/32 |
| 4,623,760 | 11/1986 | Binkerd | 379/232 |
| 4,631,666 | 12/1986 | Harris | 364/200 |
| 4,635,277 | 1/1987 | Blake | 375/20 |
| 4,636,584 | 1/1987 | Binkerd | 379/240 |
| 4,649,548 | 8/1987 | Crane | 375/7 |
| 4,677,611 | 6/1987 | Yanosy, Jr. | 370/85.200 |
| 4,680,773 | 7/1987 | Amundson | 375/8 |
| 4,696,016 | 9/1987 | Rozema | 375/20 |
| 4,715,044 | 12/1987 | Gartner | 375/8 |
| 4,750,165 | 6/1988 | Champagne | 370/24 |

Primary Examiner—Douglas W. Olms
Assistant Examiner—Dang Ton
Attorney, Agent, or Firm—Armstrong, Nikaido, Marmelstein, Kubovcik, & Murray

[57] ABSTRACT

A general purpose communications processor for communicating data between an asynchronous data terminal and a synchronous data communication facility, includes (I) a transmit module, having (a) a transmit processor, (b) an input serial communication controller, for receiving a serial asynchronous data input from the data terminal, and stripping start and stop bits from each received byte, (c) a transmit buffer, operatively connected to the controller, for temporarily storing the data, (d) an adder for adding at least a control byte to the data, and (e) an output serial communications controller for outputting the data and control byte to the synchronous data communication facility; and (II) a receive module, having (a) a receive processor, (b) a second input serial communications controller for receiving a synchronous input from the synchronous data communication facility, (c) a receive buffer, operatively connected to the second input controller, for temporarily storing the incoming synchronous data bytes, (d) a framing circuit for adding start and stop bits to the synchronous data bytes, and (e) a second output serial communications controller for outputting the data to the asynchronous data terminal.

42 Claims, 8 Drawing Sheets

APPARATUS FOR HIGH SPEED DATA COMMUNICATION WITH ASYNCHRONOUS/SYNCHRONOUS AND SYNCHRONOUS/ASYNCHRONOUS DATA CONVERSION

BACKGROUND OF THE INVENTION

This invention generally relates to an apparatus and process for converting an incoming asynchronous data signal into an outgoing synchronous data signal and vice versa. More specifically, the apparatus of the instant invention provides a general purpose communications processor which can provide a high speed conversion of asynchronous signals to synchronous signals and vice versa. The general purpose communications processor is capable of transmitting and receiving such signals at the same time. Further, the conversion of the incoming asynchronous data signal into an outgoing synchronous data signal and vice versa can be employed for high speed data communications.

With the recent proliferation of personal computers, scientific computers, business computers and computer networks, it is desirable to connect computers together in order to share data. The use of modems for communicating from computer to computer over a telephone line is well known in the art. Such modems transmit a data signal by modulating a carrier signal and sending the modulated signal over the telephone line. At the receiving end, the modulated signal is then demodulated into the original data signal and processed by the receiving computer. Such modems often run at 1,200 baud (bits per second) or 2,400 baud. However, high speed modems operate at 9,600 baud or higher.

In view of the complexity of the data and the size of the data files generated in many instances, there has been a need for higher speed data transfer.

The T1 multiplex system is a standard for interoffice communication in the North American telephone network. Each T1 carrier system operates with a DS-1 signal. The T1 digital carrier system will be described in more detail below.

In FIG. 1, a standard unswitched communications link is illustrated. Twenty-four different customers or subscribers 11 can be connected to a single channel bank 10a, such as a standard D4 channel bank in common use today. Channel bank 10a is connected to a corresponding channel bank 10b at the central office 12a by way of a T1 line 14. The central offices 12a, 12b communicate with one another on several T1 lines, a higher speed T3 line or another appropriate communication medium. Accordingly, the remote central offices are connected through channel banks 13a and 13b to customers or subscribers 15. The T1 line is a digital transmission line that operates at a speed of 1.544 megabits per second (Mbps). Each channel bank 10 has 24 channels for connections to 24 different customers or subscribers 11. These subscribers may be telephones for voice communications or they may be data terminals. The T1 lines are capable of supporting 56 K (and sometimes 64 K) bits per second of synchronous data.

In order to transmit asynchronous data over the T1 line, it is necessary to convert the asynchronous data into a synchronous data form compatible with the DS-1 signal format. An example of the DS-1 signal format used in the T1 system is illustrated in FIG. 2. As shown in FIG. 2, a frame in the T1 system consists of 193 bits. The first bit is used to establish the beginning of the frame (the framing bit). Following it are 192 bits comprising 24 code words (or channels) of 8 bits each.

As illustrated in FIG. 2 each individual frame is transmitted in 125 $\mu$s. Thus, each of the 24 channels represents a single subscriber or customer. Therefore, each subscriber provides a single byte, eight bits, to the T1 system every 125 $\mu$s. Each of the 24 channels in each frame contain 8 bits, and thus each channel provides eight bits every 125 $\mu$s. As further illustrated in FIG. 2, 12 frames form a "super frame". Each super frame is transmitted in 1.5 ms. Two super frames include 24 individual frames and are transmitted in 3.0 ms. A T1 circuit carries 24 voice channels, with each channel carrying digital PCM (pulse code modulation) representations of voice conversations at a 56 or 64 Kbps rate. For electrical transmission reasons, certain limitations are placed on the allowable digital bit patterns which may appear. If the true digital representation of a voice signal would violate the rules of what may properly be transmitted, the bit sequences are automatically modified slightly to conform with the rules. This is normally done by the codec which performs the analog/digital and digital/analog conversion of the voice signals. Even in the event that the codec does not provide ones density control (which will be further described below), and this would be the case if the customer data were digital rather than voice, therefore bypassing the codec, the channel bank's Line Interface Unit (LIU) provides ones density control by inserting a one in bit 2 whenever the other bits in the DS0 word are all zeros. This would occur at an LIU (line interface unit) at the channel bank. This may slightly modify the sound received at the receiving end, but the human ear cannot distinguish such changes. If a T1 circuit is used to carry data, however, no such changes can be permitted. The telephone carriers leave it up to the user to transmit only data which has been specially coded to avoid any rule violations, thereby preventing the T1 system from making any "fixes" which would impair the data.

In order to insure reliable recovery of the clock on an AMI (alternate mark inversion) encoded T1 line, there is a one's density requirement in which no more than 14 consecutive zero bits are transmitted, so that the T1 receiver will stay locked onto the signal. The T1 system only guarantees 14 bits of time synchronization. Therefore no more than 14 consecutive zero bits can be transmitted. In practice, however, in the LIU of a channel bank, if seven zeros are received consecutively, the channel bank automatically inserts a "1" into the next bit.

Therefore, in order to obtain the maximum throughput on a T1 line, the one's density requirement must be complied with, so that data is not compromised by the automatic insertion of a wrong bit at the channel bank.

In order to pack data onto the carrier's synchronous T1 channel at the maximum permissible rate, asynchronous to synchronous conversion must be implemented. Furthermore, after this has been done, the ones density problem must be addressed by insuring that there is at least one "one" in every byte accepted for insertion into the T1 stream. The most commonly used method of asynchronous/synchronous conversion does not strip start and stop bits from the data and therefore wastes approximately 20% of the bandwidth for synchronization purposes.

A protocol system used in synchronous communications is SDLC (synchronous data link control), which is a bit-oriented protocol. Another example of such a coding scheme is HDLC (high level data link control). HDLC is actually a superset of SDLC. However, neither the SDLC nor the HDLC coding schemes are suitable for maximizing the throughput in a T1 line in the presence of data containing streams of consecutive zeros.

In conventional SDLC protocol used for synchronous transmission, the packet length is variable and a variable amount of fill (or idle) characters are provided between packets. Because of the variable packet length and the variable amounts of fill characters between packets, a system employing the SDLC protocol requires a large amount of hardware to perform it, and is less efficient in bandwidth. Bandwidth as used in this application, refers to the number of bits per second (BPS) which can be transmitted.

Another conventional system is referred to as a bi-sync protocol which requires two sync characters at the front of a packet and a checksum at the end. This allows for a variable packet length which in turn requires excess overhead. The sync bytes are not located at specific time intervals. Thus, this protocol is also less efficient in terms of bandwidth than the instant invention.

SUMMARY OF THE INVENTION

The instant invention is intended to provide a system for transmission of data along a T1 line, or the like, at a high speed. The instant invention is also intended to be fully compatible with practical limitations presented in a T1 carrier system, for example, the ones density requirement. Specifically, in one embodiment, the instant invention provides for a system which will allow a 57.6 Kbps asynchronous data stream from a data terminal (DTE) to be converted into synchronous form and transmitted over standard 56 or 64 Kbps, synchronous telecommunications circuits (such as DDS circuits) whose data and signaling formats and bit rates are substantially standard worldwide.

The ability to transmit 57.6 Kbps over a 56 Kbps circuit is accomplished by stripping the start and stop bits that are part of the asynchronous transmission protocol, framing the remaining 46 Kbps in a synchronous bit stream, and replacing the start and stop bits before handing the transmission to a data terminal (DTE) at the distant end.

It is an object of the instant invention to provide an apparatus for converting an asynchronous data signal to a synchronous data signal and vice versa in a manner which is more efficient and thus faster than known methods. For example, in accordance with the instant invention, a device for converting asynchronous data to synchronous data, includes means for receiving an asynchronous data signal, means for stripping start and stop bits from each byte of received data to form a data byte, means for counting the number of bytes received within a predetermined time period P, and for generating a character count corresponding with the number of counted bytes, and a packet forming means for forming a message packet in synchronous form, wherein the packet has a fixed length and includes a sync byte, the character count and the data bytes formed from the bytes received in time period P.

The invention also provides for a device and method for converting synchronous data, in the form of a message packet including a sync byte, a character count, and a plurality of data bytes, to asynchronous data. The device includes means for receiving the synchronous message packet, means for detecting the sync byte in the message packet, means for detecting the character count in the message packet, and output formatting means, responsive to the detection of the character count, for outputting in asynchronous form only the number of data bytes corresponding to the character count.

The invention is also embodied in a method for converting an asynchronous data signal to a synchronous data signal, including the steps of receiving an asynchronous data, stripping start and stop bits from each byte of received data to form a data byte, counting the number of bytes received within a predetermined time period P, and generating a character count corresponding with the number of counted bytes, and forming a message packet in synchronous form, wherein the message packet has a fixed length and includes a sync byte, the character count, and the data bytes formed from bytes received in time period P.

The invention also includes a general purpose communications processor for communicating data between an asynchronous data terminal and a synchronous data communication facility, including (I) a transmit module, having (a) a transmit processor, (b) an input serial communication controller, operatively connected to the transmit processor, for receiving a serial asynchronous data input from the data terminal, and stripping start and stop bits from each received byte, (c) transmit buffer means, operatively connected to the controller, for temporarily storing said data, (d) an adding means for adding at least a control byte to the data, and (e) an output serial communications controller for outputting the data and control byte to the synchronous data communication facility; and (II) a receive module, having (a) a receive processor, (b) a second input serial communications controller for receiving a synchronous input from the synchronous data communication facility, (c) receive buffer means, operatively connected to the second input controller, for temporarily storing the incoming synchronous data bytes, (d) a framing means for adding start and stop bits to the synchronous data bytes, and (e) a second output serial communications controller for outputting the data to the asynchronous data terminal.

For example, a specific embodiment of the general purpose communications processor specifically converts synchronous data to synchronous data and vice versa, and in general to change protocol for incoming data signals and outgoing data signals. The communications processor includes first and second microprocessors sharing a common clock or having independent clocks. The first microprocessor provides protocol changes for incoming data and the second microprocessor provides protocol changes for outgoing data. USARTS are provided to couple the data between the communications transmission link and the first and second microprocessors as well as between the first and second microprocessors and the data terminals. The processor provides full duplex operation (i.e., the data protocol from the communications link is changed by the first microprocessor to be compatible with the protocol of the data terminal and an input from the data terminal is changed by the second microprocessor before being connected to the communications link).

The instant invention enables any rate of asynchronous data to be transmitted in the synchronous data stream including 38.4, 19.2, 9.6 Kbps and other sub-rates. However, it is designed to maintain an asynchronous transmission rate of 57.6 Kbps in a full duplex mode. The ability to handle lower speed asynchronous inputs occurs because the converted synchronous data stream is always running at a fixed rate which is governed by the frame length and the clock time per frame. The clock time per frame is limited only by the processor used and its instruction processing speed capacity. Thus, higher speed asynchronous data transmission rates are also possible.

The system of the instant invention transmits the 57.6 Kbps asynchronous data in "real time". Data compression is not used, nor is special line conditions required. Error detecting and correcting protocols such as X-Modem may continue to be used by the data devices connected.

Further, as discussed above, the system of the instant invention can be used with other asynchronous rates than 57.6 Kbps on synchronous circuits other than 56 or 64 Kbps. For example, a 115.2 Kbps asynchronous data stream may be incorporated within a 112 Kbps synchronous data stream. Such a procedure may be achieved simply by running the process at a higher processor speed.

The above described system for converting asynchronous signals to synchronous signals and for converting synchronous signals to asynchronous signals provides advantages not found in the conventional systems. The instant invention provides for a fixed message packet length for each message packet. Each message packet includes a sync byte and a character count. Because the start and stop bits are stripped off, and a single sync byte and the character count is provided, the bandwidth of the circuit is improved, and thus providing a system highly efficient in bandwidth. In other words, the instant invention provides for optimizing the actual data bandwidth (or the number of bits per second of actual data transmitted) per channel. A second advantage of the instant invention is that it improves the transport of timing information by locating a single sync byte at a fixed position in each message packet. For example, a sync byte is provided every 3 ms. A third advantage of the instant invention is that it provides for a means of transmitting the time base of a multiplexing system over a time base circuit. In other words, by the fixed position of the sync byte, a time base from one end may be essentially transported to the other end of the system. The sync byte can be generated synchronously with the carrier superframe rate, thereby enabling the user to byte-align the user data with the carrier frames where this is desireable. The instant invention has a fixed packet length, as described above. Information is always sent along the synchronous line, even if the character count is "0". Thus, as long as a connection is made, the present invention is always providing a synchronization between both ends of the connection. Thus, a consistent or periodic timing reference is provided which is independent of the customer or subscriber data.

BRIEF DESCRIPTION OF THE DRAWINGS

The advantages of the invention will become apparent in the following description taken in conjunction with the drawings, wherein.

DETAILED DESCRIPTION OF PREFERRED EMBODIMENTS

Figure 3:
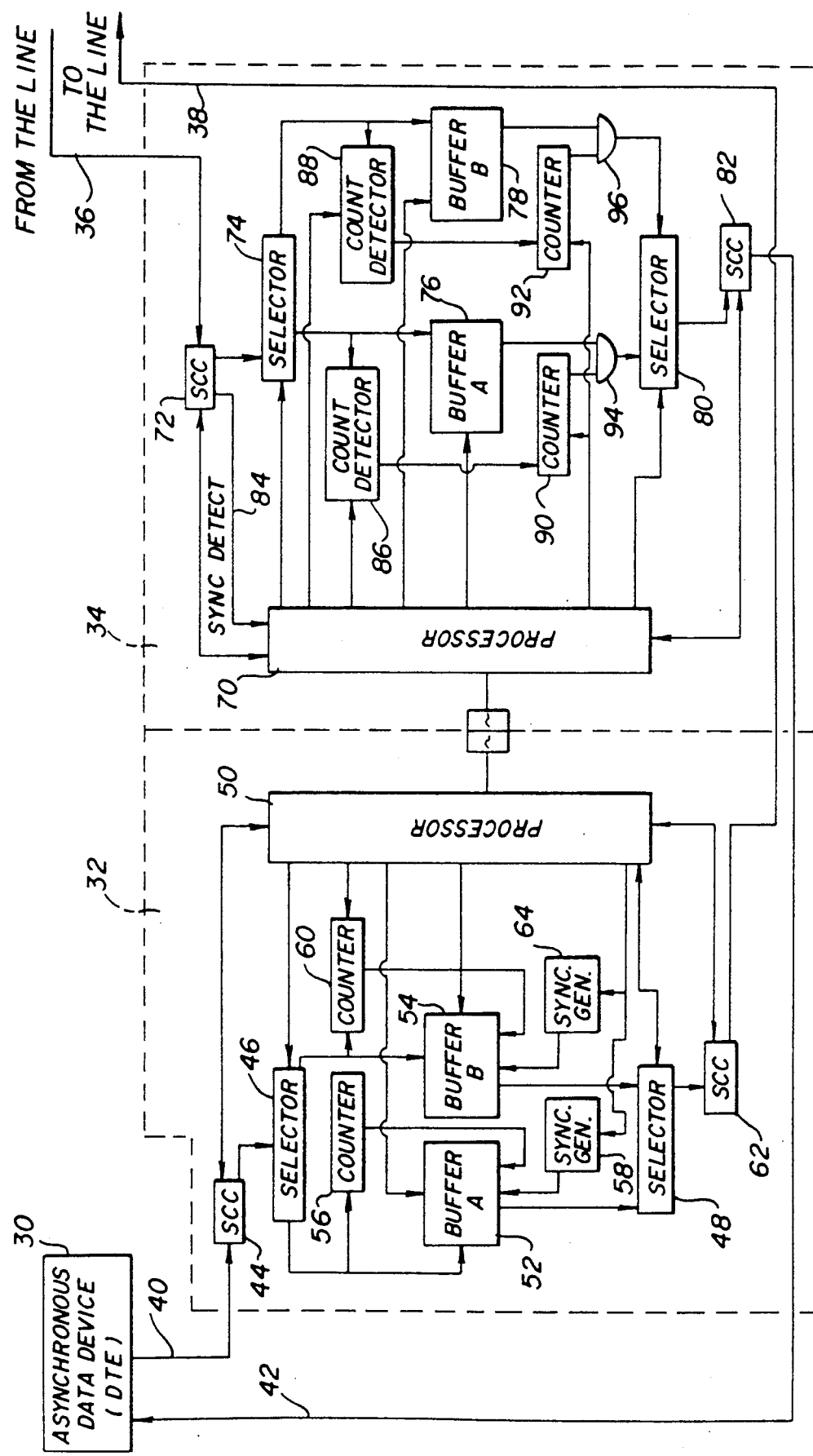
FIG. 3 is a schematic diagram illustrating an embodiment of the instant invention.

FIG. 3 is a schematic diagram illustrating an embodiment of the instant invention. Specifically, in FIG. 3, an asynchronous data terminal (DTE) 30 is connected to a transmit portion 32 and a receive portion 34 of the processor unit of the instant invention. Furthermore, a data input line 36 and a data output line 38 is provided from the data network. Thus the processor of the instant invention is capable of operating in full duplex mode.

First, the transmit portion will be described. Data, in asynchronous form, from DTE 30 is output through DTE output port 40 into a SCC (serial communications controller) which is in communication with transmit processor 50. The SCC may be a USART (universal synchronous/asynchronous receiver transmitter), or the like. SCC 44 reads the incoming asynchronous data stream and strips start and stop bits. The remaining data stream is then input to selector 46, which in response to instructions from processor 50, selects a route for the data to go through buffer A (reference numeral 52) or buffer B (reference numeral 54). Buffers A & B together form a storage means, where each stores a complete message packet alternately. In the first route (through buffer A) selector 46 is connected to buffer A 52 and counter 56. The output of counter 56 is also input to the buffer, so that the character count from counter 56 is input to the top of buffer A. For the purposes of this application, the front of a buffer is considered to be a data location which is output first, when the contents of the buffer are output. Further, a sync generator 58 is connected to processor 50 for receiving an instruction therefrom, and is further connected on its output side to buffer A. Upon instructions from processor 50, the sync generator 58 transfers a sync byte to buffer A, on the top thereof, before the character count.

The output of buffer A is input to a second selector 48. The second selector 58 is also connected to processor 50 and selects between the data from buffer A and the data from buffer B. The output of selector 48 is input to a second SCC 62 which is also in communication with processor 50. The output of SCC 62 is then provided to the data network through output line 38.

The second data route from selector 46 is provided through buffer B 54. This route is substantially the same as the route through buffer A. Specifically, selector 46 is connected to buffer B and second counter 60. Second counter 60 has an output connected to buffer B, so that the number of characters counted by second counter 60 may be input to the top of the buffer. Further, a second sync generator 64 is connected to processor 50, and provides an output connected to buffer B, for transferring a sync character or sync byte to the top of the buffer (before the character count). The output of buffer B is connected to selector 48. It should also be noted that processor 50 receives a clock pulse from clock 66.

Figure 1:
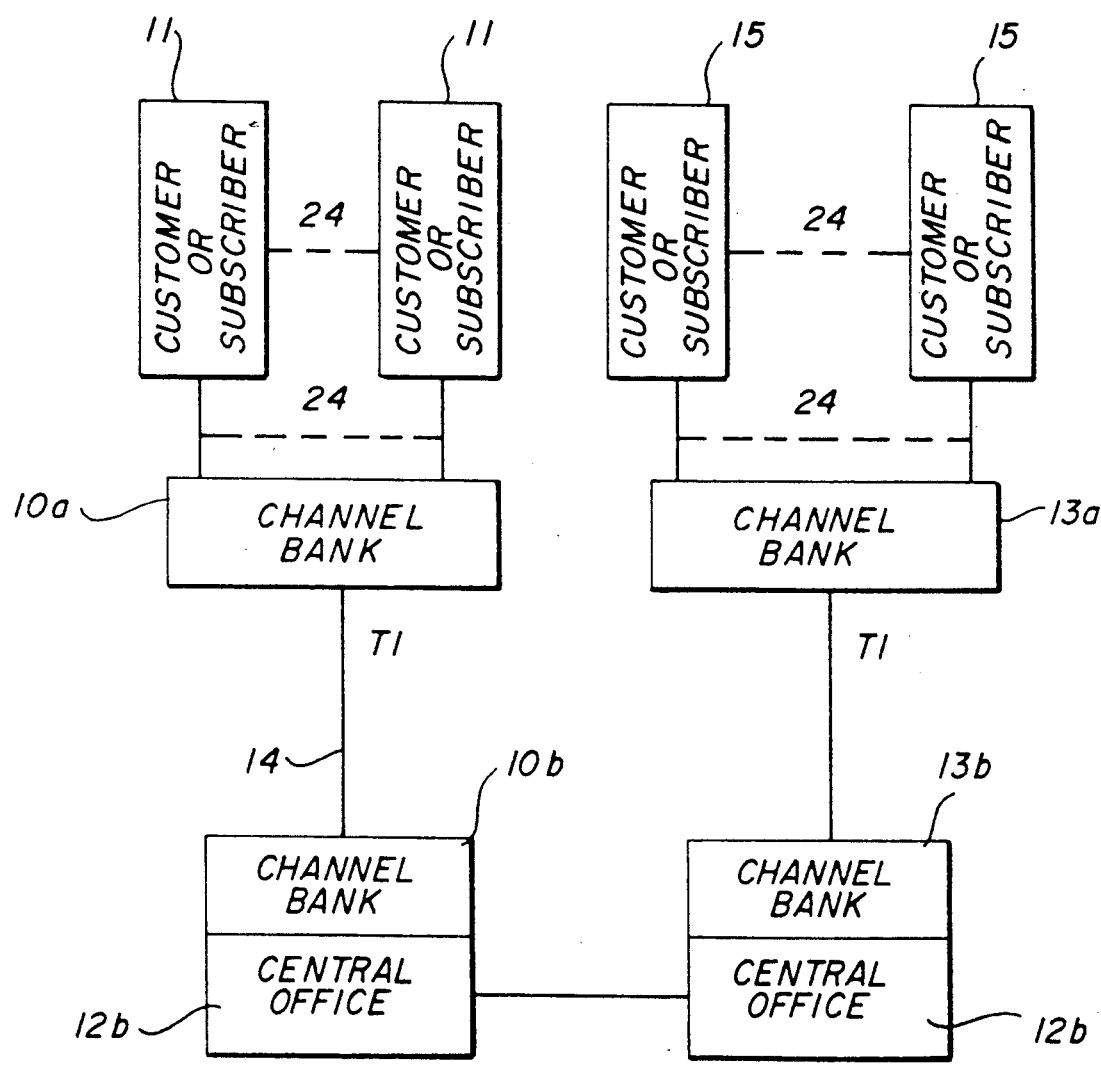
FIG. 1 is a schematic drawing of an unswitched telephone connection employing T1 data lines.
Figure 2:
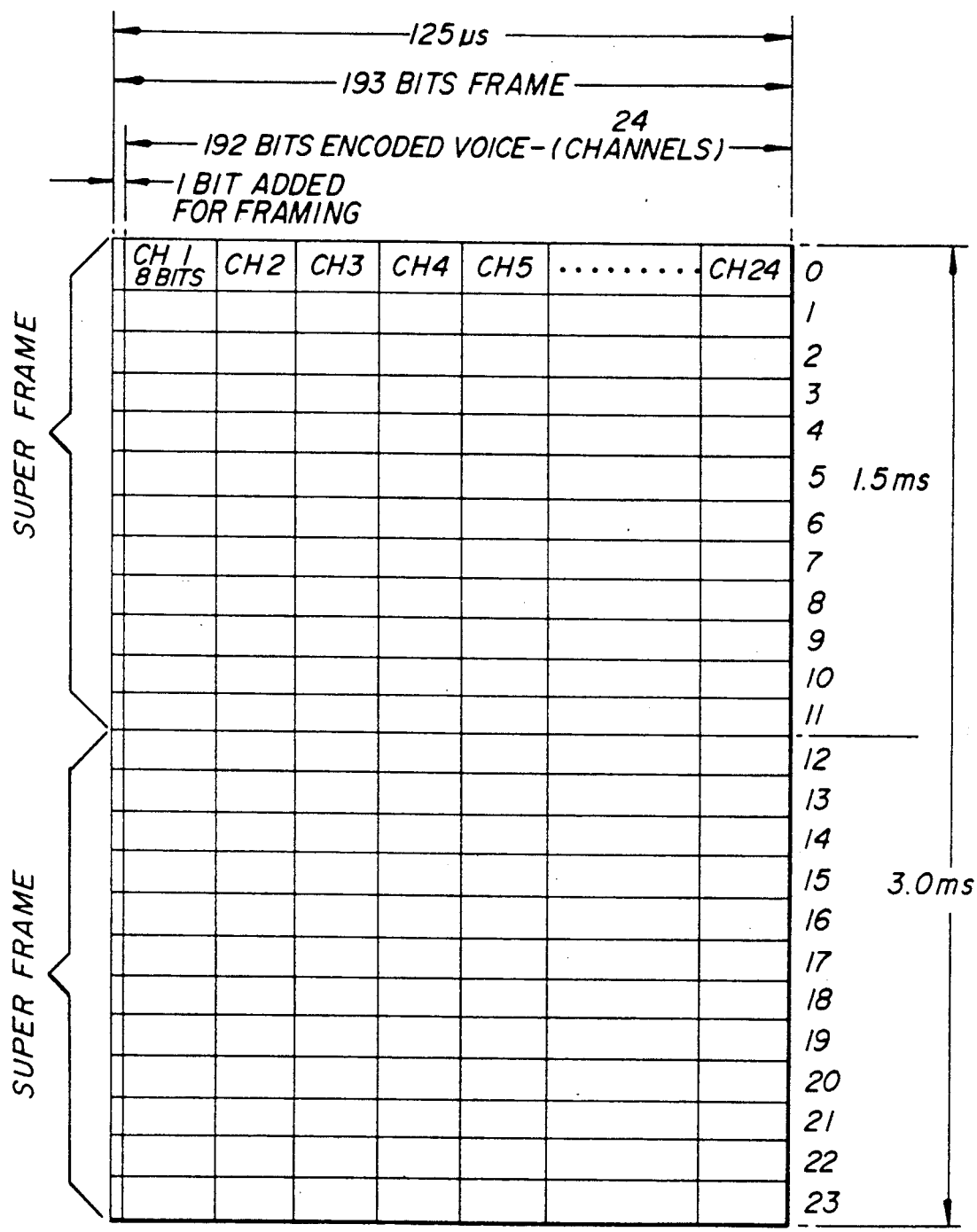
FIG. 2 is a diagram illustrating an example of a DS-1 signal format used in a T1 system.
Figure 4:
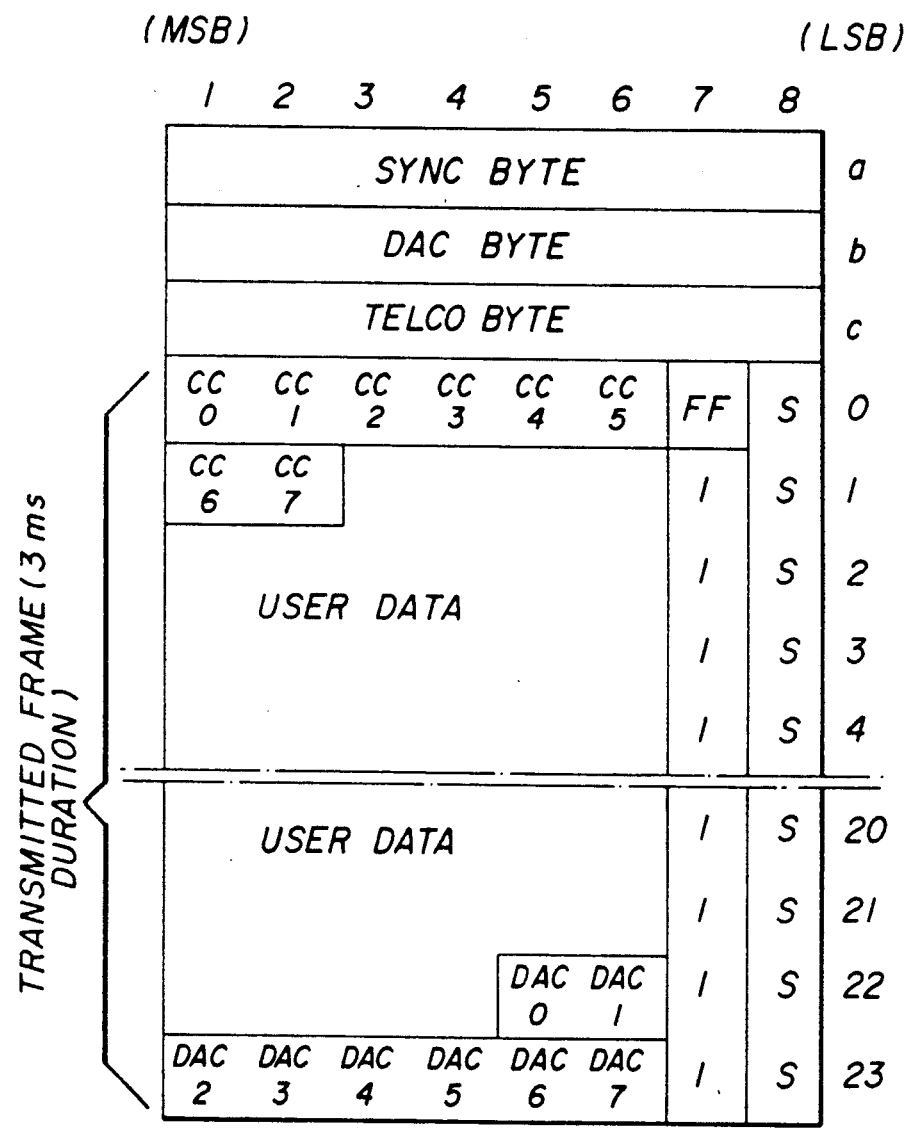
FIG. 4 is a diagram illustrating a data frame as used in the embodiment of FIG. 3.

FIG. 4 illustrates a specific form of the data packet used in the instant invention. However, it should be understood that many different forms for the data packet may be employed and still be within the scope of the instant invention. Specifically, as seen in FIG. 4, the total frame generated in the transmit portion of the instant invention has 27 bytes. The data frame as provided in the instant invention has 24 bytes of data (bytes 0-23) which are actually transmitted through the T1 carrier system. It also has three bytes of control information (bytes a, b and c) which are used internally before the 24 bytes of data are actually transmitted to the channel bank. Specifically, the transmitted frame is 24 bytes of 8 characters each. The frame duration is 3 ms. Thus, as can be seen from FIG. 2, a 24 byte data frame is transmitted in two super frames of the DS-1 signal, which has a duration of 3 ms.

Specifically, in byte a, a sync byte is sent. Byte b is called the DAC (Digital Access Control) byte. It carried control and status information between the converter 32 at one end of the circuit and converter 34 at the opposite end. This control information can include the baud rate, type of data (sync, async, voice, etc.) control codes for loopbacks, etc. In byte b, a DAC byte is provided with information for controlling new data before it is transmitted to the channel bank. Byte c is referred to as a "telco byte" which carries the telephone signal information between the subscriber and the channel bank.

Figure 5:
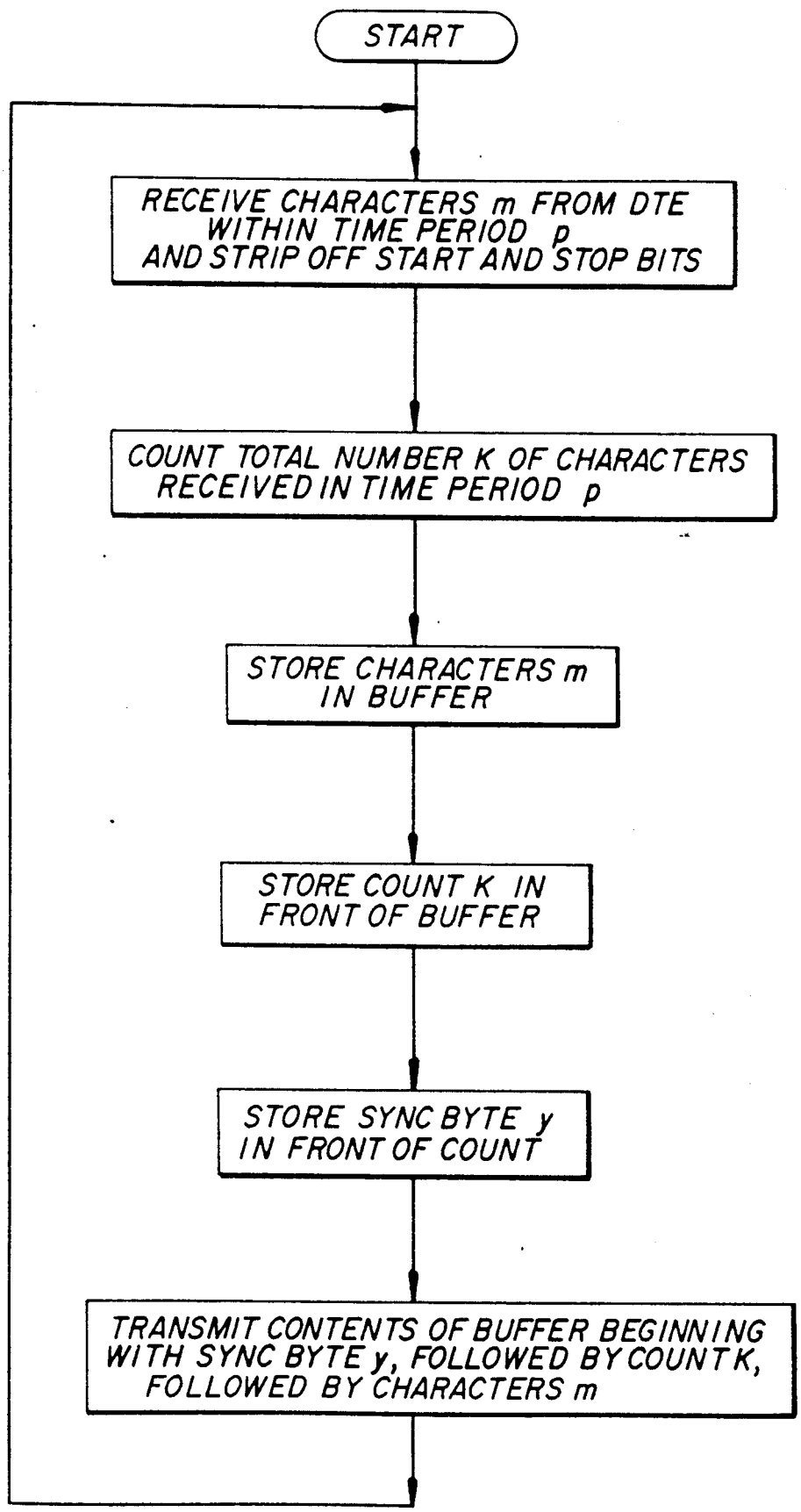
FIG. 5 is a flow chart illustrating the process of conversion of an asynchronous signal to a synchronous signal.

In general, the operation of the transmit portion 32 of the instant invention operates according to a process illustrated in FIG. 5. Specifically, the asynchronous data stream is received from DTE 3 into SCC 44, where the start and stop bits are stripped off of the data. The characters m are received from the DTE 30 within a time period P. The total number of characters received in time period P are counted in counter 56 while the characters m are then stored in buffer A. The count K of the total number of characters in the time period P (from counter 56) is then stored in the front of buffer A. A sync byte Y is then stored in front of the count K. Next, the selector 48, under control of processor 50, selects buffer A so that data from buffer A is fed into SCC 62. Processor 50 then gives the command to SCC 62 to output the data on line 38 to the data network. Thus, the output data frame includes a sync byte Y, followed by a character count K (indicating the number of characters to be transmitted in that data frame), and then followed by the actual characters m. All characters in the frame in excess of character count K are discarded in the received data line to the customer as idle after K characters have been transmitted.

When buffer A outputs the data packet through selector 48 to SCC 62, selector 46 has now selected the route through buffer B for the next packet of data. In other words, while buffer B is being filled up with data, buffer A sends data into SCC 62. On the other hand, when buffer B has filled up with data and is then sending data into SCC 62, buffer A is being refilled with data. Thus, buffers A and B work in an alternating fashion so that when one is being filled the other is sending and vice versa.

A specific embodiment of the data frame generated by the transmit portion 32 is illustrated in FIG. 4. Further, bytes 0 through 23 are the 24 bytes of data actually transmitted through the T1 carrier system. As illustrated, the most significant bit (MSB) is at position 1, while the least significant bit (LSB) is at position 8. In this specific embodiment, the least significant bit, position 8, is always reserved for a "signaling bit", which is most often used to designate on hook or off hook. Further, the second least significant bit (position 7) is also blocked off for control bits. In the first byte, position 7 is referred to as a FF (full frame) bit which will be used as described later. In bytes 1-23, a one is inserted in each of these bit slots.

Thus, the usable data space is provided in bit positions 1-6 of bytes 0 through 23. Of that usable data space, an 8 bit byte is set off as CC0-CC7 at the first of the data block. The character count K is inserted into this position. Since the maximum amount of data bytes to be transmitted is 18, the "sync bit" is one when the total number of 18 data bytes are being transmitted and the byte CC0-CC7 is used as an actual data byte for transfer. At the very end of the block of usable data bytes is a byte DAC0-DAC7. This "DAC" byte is used for internal control.

In the receive portion 34, receiver processor 70 is driven by second clock 68. In fact, clocks 66 and 68 can be a single clock or can be synchronized with one another. Incoming data is received on line 36 from the data network. The format of the incoming data received on line 36 is similar to the format of the transmitted data output on line 38. The data is first received by SCC 72 (which may be a USART or other similar device) which is in communication with receive processor 70. The operation of the receive portion 34 is essentially the opposite of the transmit portion 32. Specifically the sync character is first detected by the processor 70 through sync detect line 84. Selector 74 which is controlled by processor 70 receives the output of SCC 72 and selects one of buffer A 76 or buffer B 78 in which to insert the data. A count detector 86 detects the character count from the stream bytes transmitted from selector 74 to buffer A. The output of the count detector is input to counter 90. The outputs of buffer A and counter 90 are input to an AND gate 94 which provides an output to selector 80. When the counter 90 reaches the character count (i.e. the total number of data bytes to be transmitted) the counter turns off, thus disabling AND gate 94. Additionally, corresponding with buffer B of the receive portion 34, a count detector 88 receives the character count and applies the same to counter 92. The output of counter 92 is input to an AND gate 96, which receives its other input from buffer B. The output of AND gate 96 is then input to selector 80. These features operate the same way as buffer A, so that only the actual number of data bytes which are sent (corresponding to the character count) are actually transferred to selector 80 for transmitting to DTE 30.

Thus, the number of characters according to the character count K are transferred from buffer A to selector 80 and further to SCC 82. SCC 82 adds the necessary start and stop bits and outputs data (in asynchronous format) back to DTE 30 along line 42. As with the transmit portion 32, in the receive portion 34 buffers A and B operate alternately so that when one is filling the other is sending and vice versa.

Figure 6A:
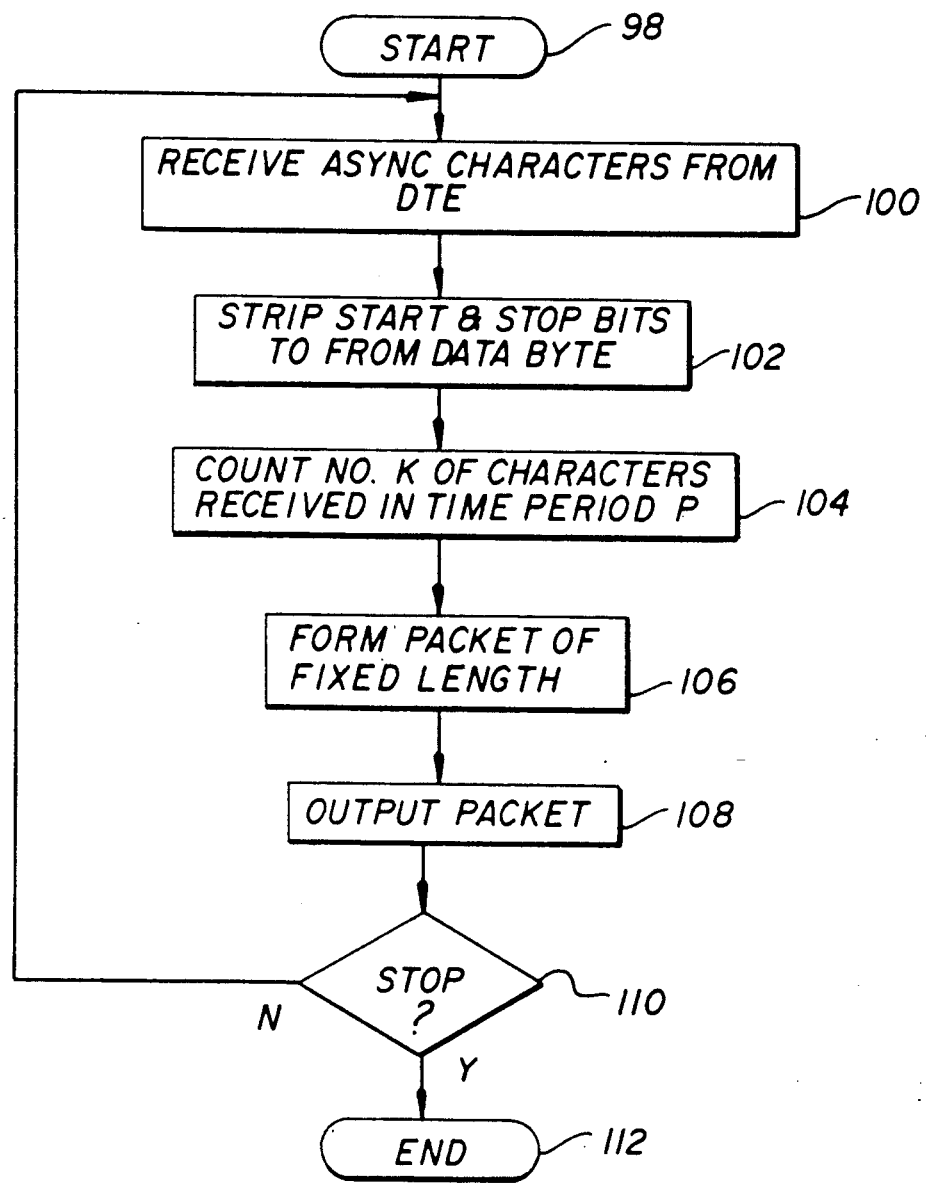
FIGS. 6A-6C represent a process for converting an asynchronous data signal to a synchronous data signal.

FIG. 6A represents the process of converting an asynchronous data signal into the form of a synchronous data signal, as used in the general purpose communications processor illustrated in FIG. 3. Specifically, it is the process used in the transmit portion 32 of the general purpose communications processor. It should be noted that this process for converting the asynchronous data signal to a synchronous data signal can be accomplished either through hardware as illustrated in FIG. 3, or through software.

FIG. 6A illustrates a basic process or program for converting asynchronous data signals to synchronous data. Step 98 corresponds with a start of the process. Step 100 represents receiving asynchronous characters from a data terminal (such as DTE 30). Next, in Step 102, the start and stop bits are stripped from each of the asynchronous characters to form individual data bytes. Step 104 counts the number K of characters received in a time period T. In Step 106, a message packet is formed (in synchronous form) having a fixed length and including a sync byte, a character count, and the data bytes received from the DTE 30. Step 106 will be described in further detail below. Step 108 relates to a step of outputting the message packet to a synchronous communication network. Individual message packets are output adjacent one another, without any fill space (also referred to as idle space) in between adjacent message packets. Step 110 merely checks to see if it is time to stop the communication. If the answer is NO, then the process returns to Step 100. If the answer to Step 110 is YES, then the process is over, and it proceeds to the end at Step 112.

Figure 6B:
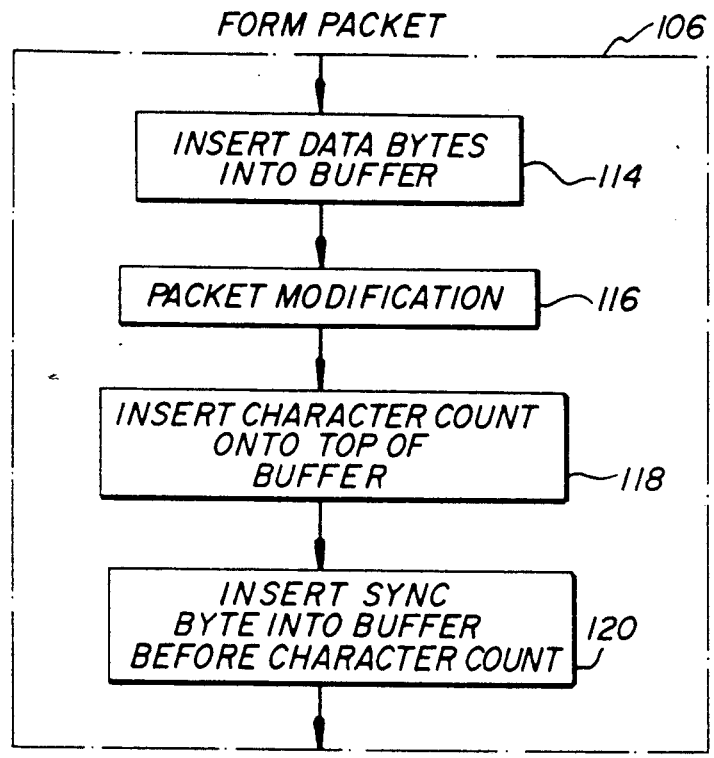

Step 106 which includes forming the message packet of a fixed length may also include the steps illustrated in FIG. 6B. For example, in FIG. 6B, Step 106 of forming the message packet may include one or all of the steps illustrated. Step 114 inserts the received data bytes into the buffer. Step 116 is a general step for modifying the packet or data bytes in the packet. This step may occur at any point in Step 106. Packet modification Step 116 will be described in more detail below. Next, Step 118 inserts the character count onto the top of the buffer (in front of the data bytes). Step 120 then inserts a sync byte into the buffer before the character count.

Figure 6C:
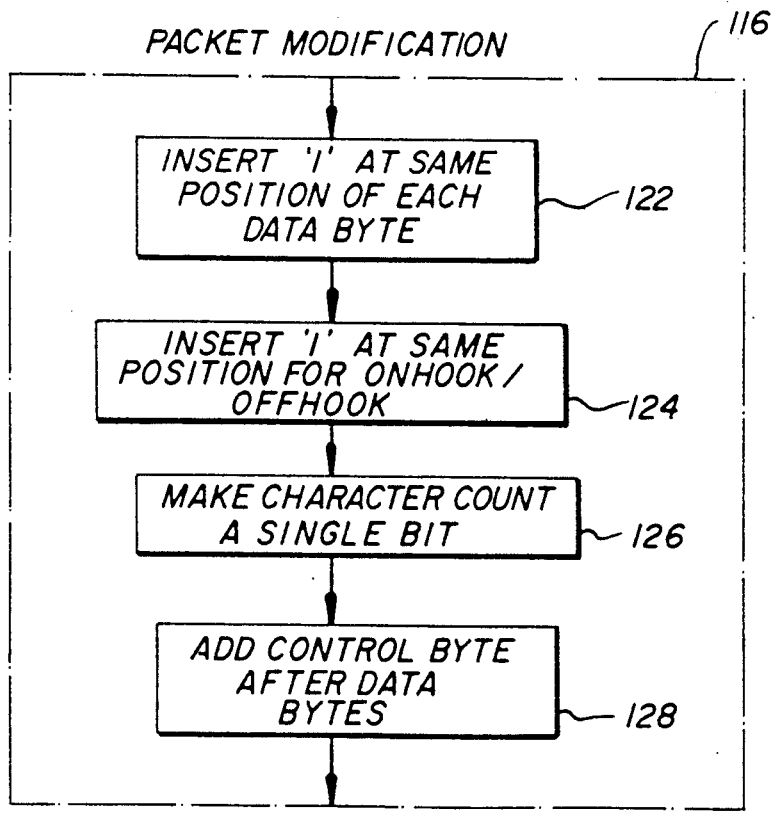

As stated above, the packet modification Step 116 is illustrated in more detail in FIG. 6C. The subroutine for packet modification 116 can be understood in combination with the packet diagram in FIG. 4. The individual steps in packet modification Step 116 may be employed singly, all together, or not at all. Step 122 inserts a logic I at the same position of each data byte. Step 124 inserts a logic 1 at a fixed position in each byte for signaling onhook/offhook. Step !26 makes the character count a single bit as illustrated bit FF (full frame) which indicates that the maximum number of characters is being transmitted. Step 128 adds a control byte after data bytes in the packet. This is represented in FIG. 4 by the byte DAC 0 through DAC 7.

Figure 7:
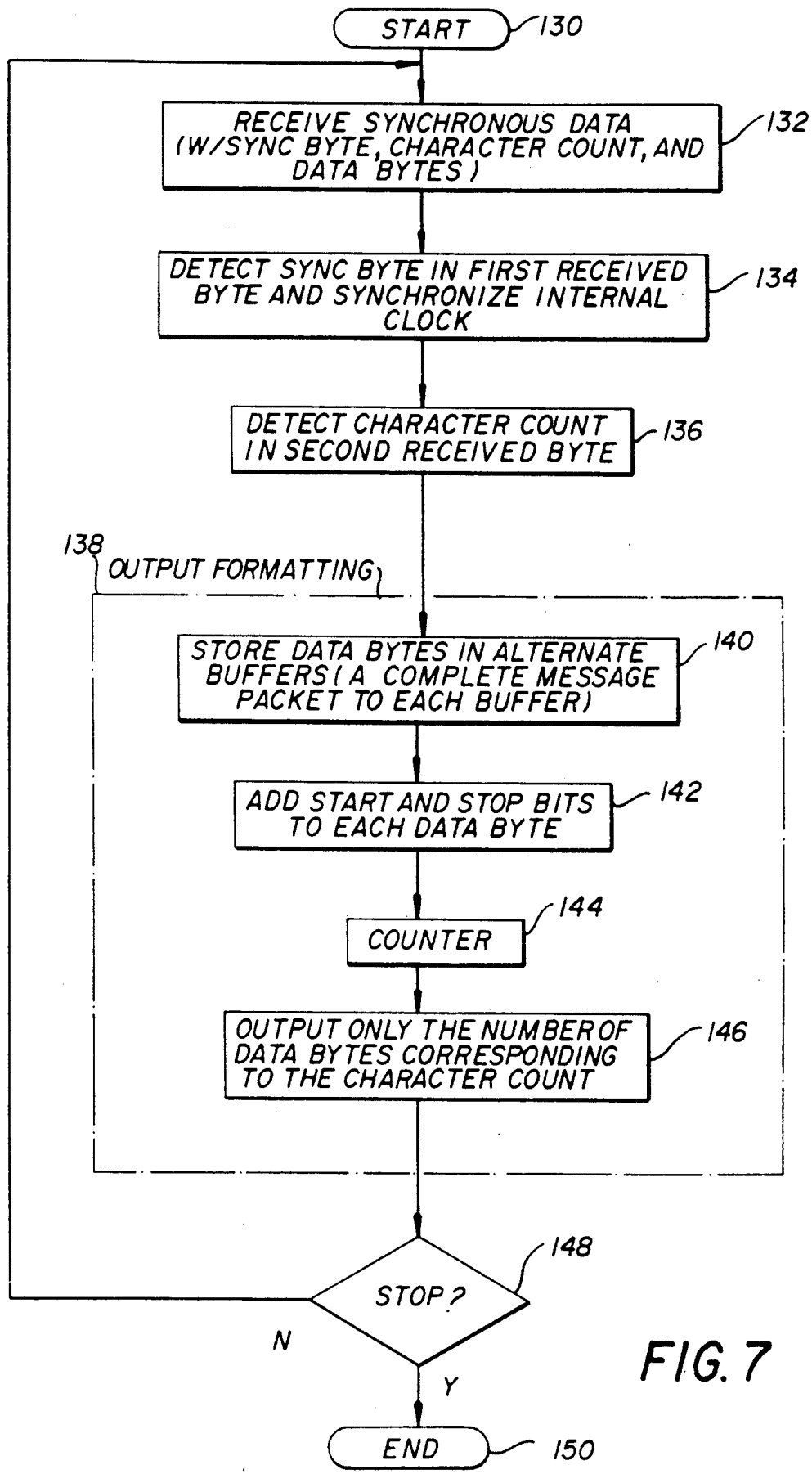
FIG. 7 represents a process for converting a synchronous data signal to an asynchronous data signal.

FIG. 7 represents the process of converting a synchronous data signal, in the form of a message packet including a sync byte, a character count, and a plurality of data bytes, into an asynchronous data signal, as used in the general purpose communications processor illustrated in FIG. 3. Specifically, it is the process employed in the receive portion 34 of the general purpose communications processor. It should be noted that this process for converting the synchronous data signal to an asynchronous data signal can be accomplished either through hardware as illustrated in FIG. 3 or through software.

FIG. 7 represents the basic process or program for converting synchronous data signals to asynchronous data signals. Step 130 corresponds with a start of the process. Step 132 represents a step of receiving synchronous data in the form of a message packet which includes a sync byte, a character count, and a plurality of data bytes. Next, Step 134 the text the sync byte by checking the first receive byte to see if it corresponds with a predetermined sync byte pattern. Of course, it is possible that the sync byte may be positioned somewhere else within the message packet, in which case the step for detecting the sync byte would check in the predetermined position for the sync byte. Of course, it is most practical to position the sync byte in the first receive byte of the message packet. Also, Step 134 includes synchronizing the internal clock with the detected sync byte. Since a sync byte is located in a fixed position in each message packet, the detection of the sync byte provides timing security for the complete message packet. In Step 136, the character count is detected. Preferably, the character count is found in the second received byte. However, as with the sync byte, the character count may be located at another position within the message packet.

Step 138 represents the output formatting step which includes a number of sub-steps or sub-processes for formatting the output in the necessary asynchronous form to be output to an asynchronous data terminal. The output formatting Step 138 includes Step 140 which stores the data bytes in alternate buffers. The data bytes may be stored in a single buffer, however, at least two buffers, each alternately loaded with a complete message packet, is preferable. Step 142 adds start and stop bits to each data byte. Step 144 receives the output of the detected character count and provided the count to Step 145 which outputs only the number of data bytes corresponding to the detected character count. Step 148 merely checks to see if it is time to stop the communication. If the answer is NO, the process returns to Step 132. If the answer is YES, then the process is over and it proceeds to the end at Step 150.

An advantage of the general purpose communications processor as illustrated in FIG. 3, is that it provides for a low cost, stand alone, communications system which provides for extremely fast communications. The use of a transmit processor and a receive processor enables the system to operate in full duplex mode. The employment of a transmit processor and a receive processor enables the system to use two commonly available processors, rather than a single exotic, super fast processor. For example, the speed with which the receive processor 70 can communicate with the SCC 82 (for example a USART) may be kept to a reasonable level, rather than at a super high speed. Because of the use of two normal processors, a dramatic cost difference and thus a lower manufacturing cost can be obtained when compared with using a single very high speed processor. Using a transmit and a receive processor enables independence of the transmit channel from the receive channel and thus enables protocols, speeds, etc. to be independent of one another.

Although the above system has been described in reference to the operation of a T1 system, in common use in the United States, as well as other countries, it should be noted that the instant invention may be employed with other systems in use. For example, the instant invention may be easily employed in a European standard primary digital multiplex system. Such a signal (the CCITT Primary Multiplex Signal) employs a frame with 32 channels of 8 bits each, rather than the 24 channels of the DS-1 signal. The first channel or byte is used as a framing signal, the second through sixteenth channels are for encoded speech or data, the seventeenth channel is for signaling information for each channel, and the remaining fifteen channels are for encoded speech or data. Thus, there are thirty data bytes, one framing word and one signaling word in each thirty-two byte frame. Since the frames occur at the standard 8,000 per second rate, the data rate is 256 bits in 125 ms or 2.048 Mbps. The instant invention is fully applicable to the above European system, as well as others in existence.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A device for converting asynchronous data to synchronous data, comprising:
    stripping means for stripping start and stop bits from each byte of received asynchronous data to form a plurality of data bytes;
    means for counting the number of data bytes received from said stripping means within a predetermined time period P, and for generating a character count corresponding with the number of counted bytes; and
    packet forming means for forming a message packet in synchronous form, said message packet having a fixed length and including a sync byte, said character count, and said plurality of data bytes formed from bytes received by said stripping means in a predetermined time period P.

2. The device of claim 1, wherein said sync byte is located at a predetermined fixed position in each message packet.

3. The device of claim 2, wherein said character count is located at a predetermined fixed position in each message packet.

4. The device of claim 1, further comprising output means for outputting a plurality of said message packets wherein each message packet is adjacent a previous and a subsequent message packet, without fill space therebetween.

5. The device of claim 3, wherein said packet forming means includes a buffer means for receiving each data byte therein during time period P.

6. The device of claim 5, wherein said packet forming means also includes means for inserting said character count in said buffer means, in front of said data bytes.

7. The device of claim 6, wherein said packet forming means further includes means for inserting said sync byte in said buffer means, in front of said character count byte and said data bytes.

8. The device of claim 4, wherein said output means outputs each message packet within two superframes of a DS-1 signal format.

9. The device of claim 1, wherein said time period P corresponds to two superframes of a DS-1 signal format.

10. The device of claim 9, wherein said time period P is substantially 3 ms.

11. A process for converting an asynchronous data signal to a synchronous data signal, comprising the steps of:
    stripping start and stop bits from each byte of a received asynchronous data signal to form a plurality of data bytes;
    counting the number of asynchronous data bytes received within a predetermined time period P, and generating a character count corresponding with the number of counted bytes; and
    forming a message packet in synchronous form, said message packet having a fixed length and including a sync byte, said character count, and said data bytes formed from bytes received in time period P.

12. The process of claim 11, wherein said forming step locates said sync byte at a predetermined fixed position in each message packet.

13. The process of claim 12, wherein said forming step locates said character count at a predetermined fixed position in each message packet.

14. The process of claim 11, further comprising the step of outputting a plurality of said message packets, wherein each message packet is adjacent a previous and a subsequent message packet, without fill space therebetween.

15. The process of claim 12, wherein said forming step includes the step of storing each data byte in a buffer during time period P.

16. The process of claim 15, wherein said forming step also includes the step of inserting said character count in said buffer means, in front of said data bytes.

17. The process of claim 16, wherein said forming step further includes the step of inserting said sync byte in said buffer, in front of said character count byte and said data bytes.

18. The process of claim 14, wherein said outputting step outputs each message packet within two superframes of a DS-1 signal format.

19. The process of claim 11, wherein said time period P corresponds to two superframes of a DS-1 signal format.

20. The process of claim 19, wherein said time period P is substantially 3 ms.

21. A device for converting synchronous data, in the form of a message packet including a sync byte, a character count, and a plurality of data bytes, to asynchronous data, the character count corresponding to the number of counted bytes of data in the message packet, said device comprising:
    means for detecting the sync byte in the received message packet;
    means for detecting the character count in the received message packet; and
    output formatting means, responsive to the detection of the character count, for outputting in asynchronous form only the number of data bytes corresponding to the character count.

22. The device of claim 21, wherein said output formatting means includes an adding means for adding start and stop bits to each data byte.

23. The device of claim 21, wherein said output formatting means further includes a storage means for storing the data bytes before being output.

24. The device of claim 23, wherein said storage means includes two buffers, each storing a complete message packet, alternately.

25. The device of claim 21, wherein said sync byte detecting means detects the first byte in the message packet to determine if it is the sync byte.

26. The process of claim 25, wherein said character count detecting means detects the second byte in the message packet to determine the character count.

27. The process of claim 21, wherein said output formatting means includes a counter, receiving the character count from said character count detecting means, for inhibiting the output thereof after the number of bytes corresponding to the character count have been output.

28. The process of claim 21, further including means for synchronizing an associated clock with the sync byte.

29. A process for converting synchronous data signals, in the form of a message packet including a sync byte, a character count, and a plurality of data bytes, to asynchronous data signals, the character count corresponding to the number of counted bytes of data in the message packet, said process comprising the steps of:
   detecting the sync byte in the received synchronous message packet;
   detecting the character count in the received synchronous message packet; and
   output in asynchronous form, in response to the detection of the character count, only the number of data bytes corresponding to the character count.

30. The process of claim 29, wherein said outputting step includes the step of for adding start and stop bits to each data byte.

31. The process of claim 29, wherein said outputting step includes the step of storing the data bytes before being output.

32. The process of claim 31, wherein said storing step includes the step of storing a complete message packet, in one of two buffers, alternately.

33. The process of claim 29, wherein said sync byte detecting step detects the first byte in the message packet to determine if it is the sync byte.

34. The process of claim 33, wherein said character count detecting step detects the second byte in the message packet to determine the character count.

35. The process of claim 29, wherein said outputting step includes an inhibiting step, responsive to an input of the character count, the output of bytes after the number of bytes corresponding to the character count have been output.

36. The process of claim 29, further including step of synchronizing an associated clock with the sync byte.

37. A device for communicating data between an asynchronous data terminal and a synchronous data communication facility in which the data forms a message packet, the message packet including a sync byte, a character count, and a plurality of data bytes, the character count corresponding to the number of counted bytes of data in the message packet, comprising:
   (I) a transmit module, including
      (a) a transmit processor,
      (b) an input serial communication controller means, operatively connected to said transmit processor, for receiving a serial synchronous data input form the data terminal, and for stripping start and stop bits from each received byte to produce stripped data,
      (c) transmit buffer means, operatively connected to said controller means, for temporarily storing said stripped data,
      (d) message packet forming means for forming a message packet from said stripped data stored by said transmit buffer means, said message packet comprising a sync byte, a character count, and a plurality of data bytes, the character count corresponding to the number of counted bytes of data in the message packet,
      (e) an output serial communications controller means for outputting said data as said message packet to said synchronous data communication facility; and
   (II) a receive module, including
      (a) a receive processor,
      (b) a second input serial communications controller means for receiving said message packet as a synchronous input from the synchronous data communication facility,
      (c) receive buffer means, operatively connected to said second input controller means, for temporarily storing the incoming synchronous data bytes,
      (d) means for detecting said sync byte in said received message packet,
      (e) means for detecting said character count in said received message packet,
      (f) a framing means responsive to the detection of said character count for adding start and stop bits to said synchronous data bytes to produce asynchronous data,
      (g) a second output serial communications controller means for outputting said asynchronous data to said synchronous data terminal.

38. The device of claim 37, further comprising means for inputting synchronized clock pulses to said transmit and receive processors.

39. The device of claim 37, wherein said transmit buffer means includes first and second buffers parallel with one another.

40. The device of claim 39, further comprising:
   a first selector means, interposed between said input controller means and said buffers, for selecting one of said buffers for receiving the output of said input controller means; and
   a second selector means, interposed between said buffers and said output controller means, for selecting the output of one of said buffers to be transferred to said output controller means.

41. The device of claim 37, wherein said receive buffer means includes first and second buffers parallel with one another.

42. The device of claim 41, further comprising:
   a first selector means, interposed between said second input controller means and said buffers, for selecting one of said buffers for receiving the output of said second input controller means; and
   a second selector means, interposed between said buffers and said second output controller means, for selecting the output of one of said buffers to be transferred to said second output controller means.

* * * * *